Figures 1, 2, 3:
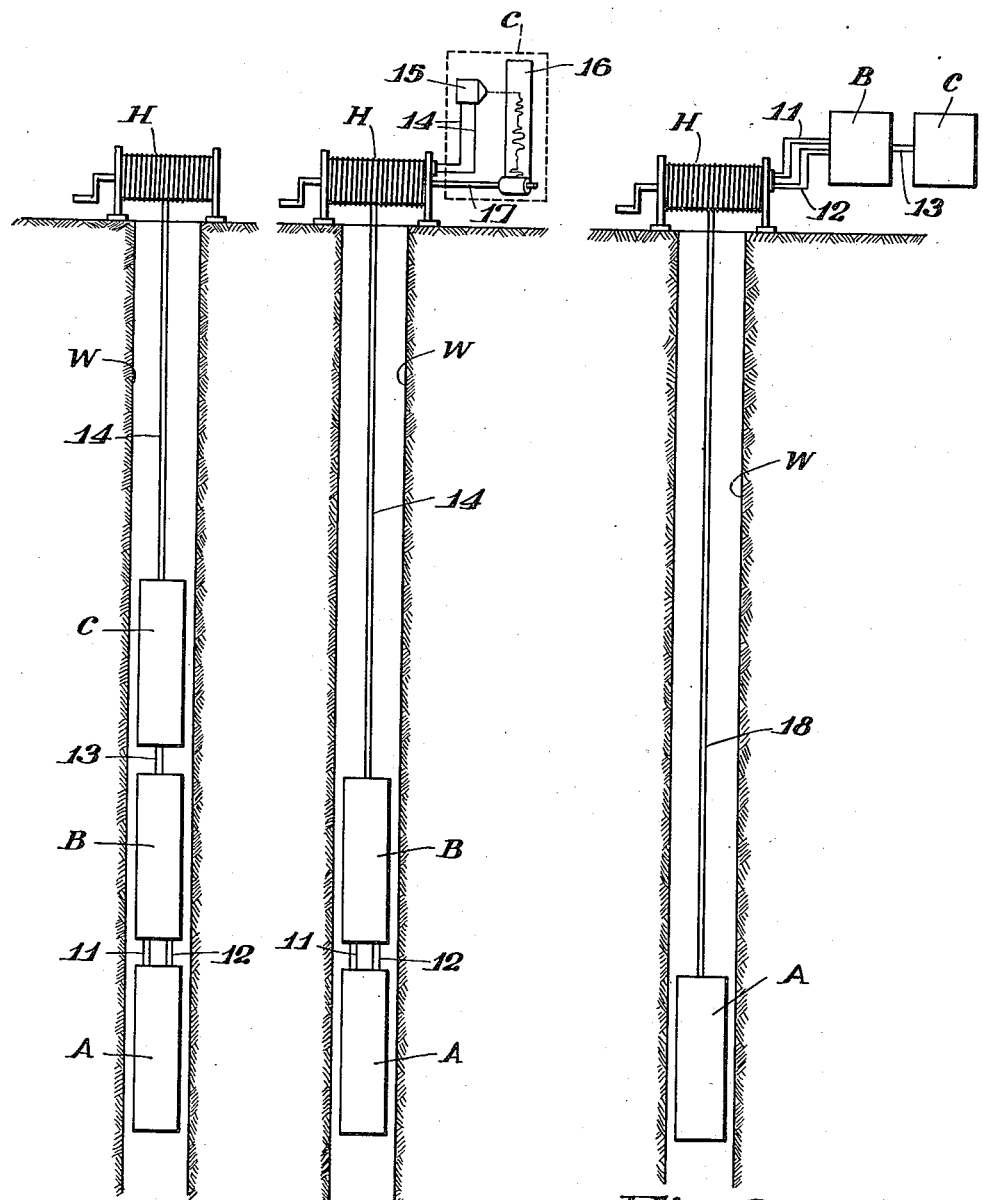

INVENTOR
Raymond T. Cloud
BY Geo. L. Parkhurst
ATTORNEY

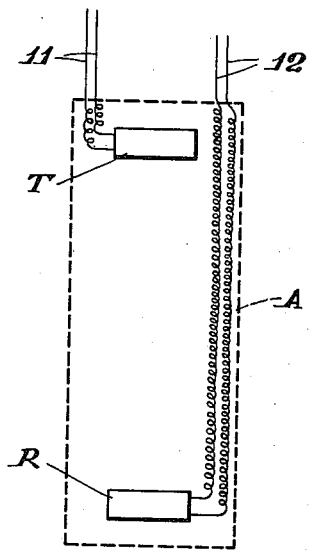
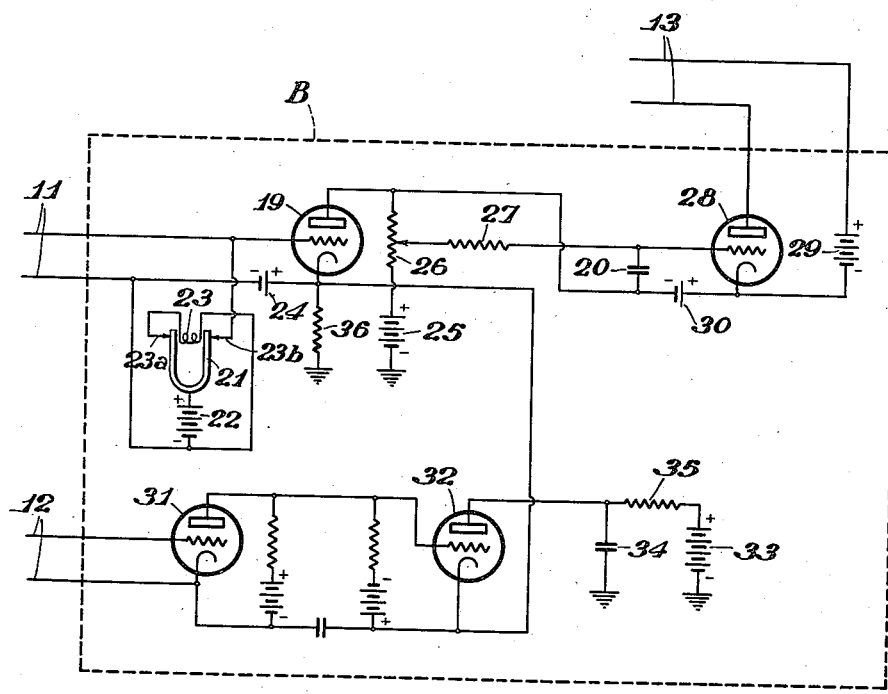
Fig. 4
Fig. 5

Patented Apr. 22, 1941

2,238,991

UNITED STATES PATENT OFFICE 2,238,991

MEASUREMENT OF SOUND VELOCITIES IN STRATA TRAVERSED BY BOREHOLES

Raymond T. Cloud, Tulsa, Okla., assignor to Stanolind Oil and Gas Company, Tulsa, Okla., a corporation of Delaware Application September 2, 1938, Serial No. 228,107

3 Claims. (Cl. 181—0.5)

My invention relates to means for continuously measuring the velocities of sound in the strata traversed by boreholes.

In seismic prospecting it is extremely desirable to ascertain the actual velocities of sound in the various strata below the surface of the ground. The reason for this is that in interpreting the field data showing the times at which the various reflections take place, actual depths depend upon the velocities as well as the times involved.

Therefore, the more accuracy and detail available as to the seismic wave velocities for the underlying formations in any given locality the more accurate will be the depth locations obtained from the seismic data. Usually these velocity determinations are made by lowering a seismometer down the borehole and shooting charges of explosive at the surface of the ground near the top of the well. The time for the wave to pass from the explosion point to the well seismometer is taken for various depths below the surface and a curve prepared showing the average velocities from the surface to these depths.

Unless an extremely large number of shots is taken, variations in velocity due to the change in velocity from one stratum to another do not show up in detail and the expense and time involved for such a large number of shots is usually prohibitive.

The object of the present invention is to provide a device for obtaining such information in great detail in a rapid and inexpensive manner. Another object of my invention is to provide apparatus for obtaining such information in cased wells. Other and more detailed objects, uses and advantages of my invention will become apparent as the description thereof proceeds.

Detailed information concerning the velocities of sound in the strata traversed by boreholes can also be used to advantage as a method of well logging so that correlations can be made by identifying the same strata in various wells in a given vicinity thus permitting determination of the natures and slopes of the subterranean structures.

In general the device of my invention operates by initiating a sound impulse in the liquid column or against the walls of the borehole and receiving this impulse by means of a receiver a short distance removed either above or below the transmitter. The time interval is measured electrically. The first arrival of the sound wave at the receiver is via the walls of the borehole as the velocity of sound in the walls is much higher than in the liquid column within the borehole.

Figure 6:
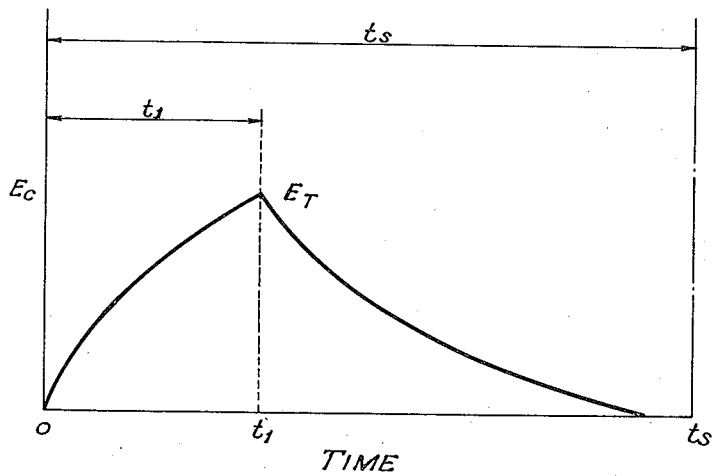
Figure 7:
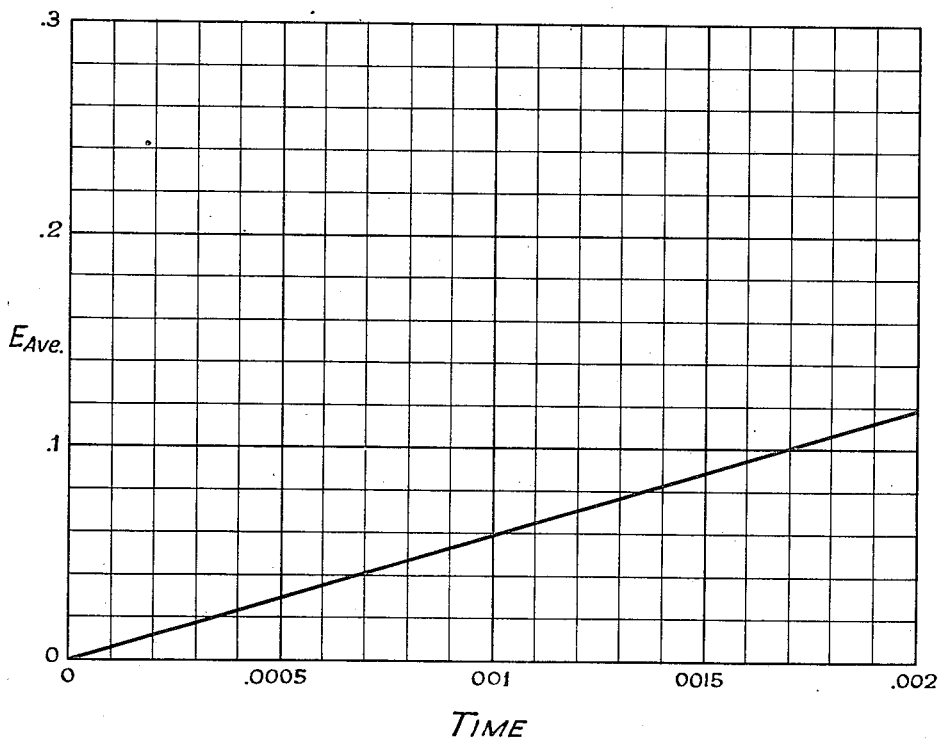

My invention will now be described in more detail with particular reference to the accompanying drawings which form a part of this specification and are to be read in connection therewith. In these drawings like reference characters indicate like or corresponding parts. The figures include:

Figures 1, 2 and 3 which show highly diagrammatic forms of my invention and illustrate the fact that certain parts of my invention can be inserted in the borehole to be surveyed or can be above ground;

Figure 4 which illustrates in similarly diagrammatic fashion the transmitter and recorder element of my device;

Figure 5 which shows one embodiment of the main portion of my device comprising the transmitter-actuating and receiver-actuated instruments;

Figure 6 which is a chart illustrating the trend of condenser voltage with time;

Figure 7 which shows the average condenser voltage as a function of time; and

Figure 8:
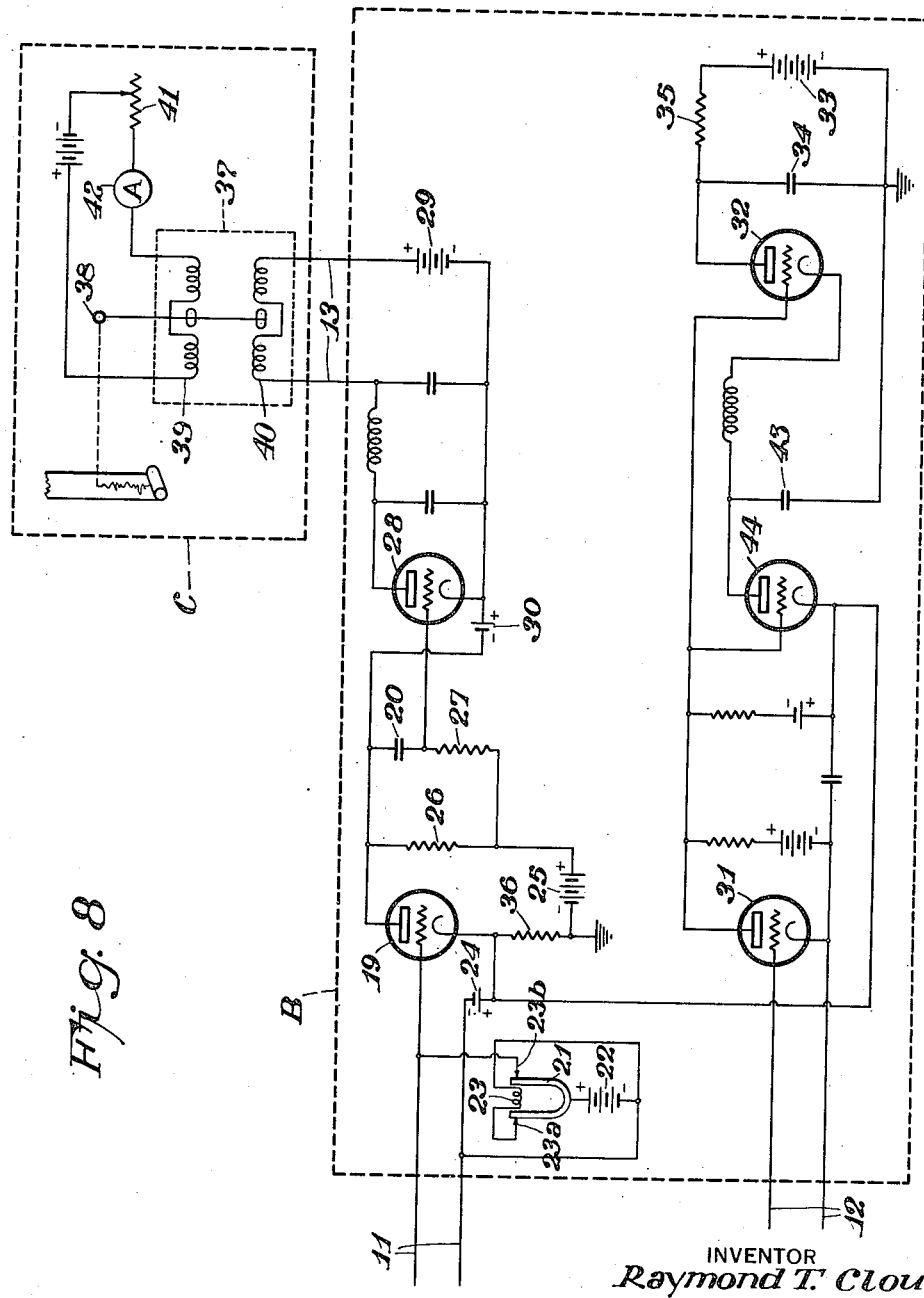

Figure 8 which illustrates another embodiment of those elements of my invention marked "B" and "C" in the drawings.

Turning to Figures 1, 2 and 3 it will be seen that a transmitter and receiver element A is inserted in the borehole or well W used to determine seismic wave velocities for the various subsurface formations. This element A is connected by two pairs of electrical leads 11 and 12 to element B which contains the transmitter-actuating and receiver-actuated instruments as will hereinafter appear. Element B is in turn connected by a pair of leads 13 to element C which is the recorder.

In Figure 1 all three elements of my apparatus are inserted into the borehole and are raised and lowered together by hoist H at a rate of a lower order of magnitude than the velocity of sound in the strata traversed by the borehole. In actual practice these three elements A, B and C can be united in a common casing but I have not shown the mechanical structure since this can readily be worked out in various ways by those skilled in the art.

Figure 2 illustrates the fact that recorder C can be located above the surface and in fact I prefer this arrangement. Here leads 14 can be incorporated in a supporting cable passing to hoist H and pass out therefrom through slip rings to a galvanometer 15 which throws an image on photosensitized paper 16, the motion of which is synchronized with hoist H as indicated by shaft 17. A direct record of seismic (sound) velocity, or some function thereof, versus depth can thus be obtained.

As shown in Figure 3 merely the transmitter and receiver element A can be lowered into the well and the instruments B as well as the recorder C can be above ground. In this case two pairs of conductors 11 and 12 are both contained within cable 18 and emerge from hoist H via slip rings.

Figure 4 illustrates in highly diagrammatic fashion the transmitter and receiver element A. Transmitter T can be any of the well known devices for converting electrical energy to sound such as a diaphragm or cone driven by electromagnetic means. It is not essential that the sound emitted from the transmitter be of the same form as the electric wave actuating the device by means of a hammer or clapper such as is used in electric door bells. One method of actuating this transmitter will be described in connection with Figure 5.

Receiver R can be of any known type capable of converting a sound pulse into an electrical signal. It can, for instance, be similar to the conventional carbon grain telephone transmitter.

Elements T and R can be separated vertically by any appropriate distance, depending on the degree of detail and accuracy desired and the sensitivity of the instruments available. Distances of from 5 to 50 feet between transmitter T and receiver R are generally appropriate. The minimum distance should be such that the pulse travelling from transmitter to receiver via the strata traversed by the borehole will arrive before the pulse traversing the liquid column in the hole and this depends partly on the diameter of the borehole. Transmitter T can, of course, be either above or below receiver R.

The time interval between the pulses actuating transmitter T depends upon the circuit constants of the instruments used and the spacing between the transmitter and receiver, but in all cases this interval must be several times greater than the time it takes for a sound wave to travel in the liquid column between the transmitter and the receiver. Thus assuming that this liquid is water through which sound travels at the rate of approximately 5,000 feet per second and the separation between transmitter and receiver is 10 feet, the time interval between pulses must be somewhat greater than 0.002 of a second.

This is so that the comparatively slow moving wave through the water column will not interfere with the succeeding wave pulse through the walls adjacent to the bore hole where the velocity is much greater than that through the liquid. It also permits a complete discharge of the timing condenser following a timing impulse.

Since the first sound wave to reach receiver R from transmitter T must be that passing via the walls of well W, any structural elements between transmitter and receiver must be of low seismic velocity material or must be shaped to provide a long path. Thus leads 12 between receiver R and transmitter T can be suitably arranged in helical form as shown.

Turning to Figure 5 it will be seen that the grid circuit of a Thyratron or gaseous grid control device 19 is arranged in parallel with transmitter T. As is well known in the art, this Thyratron tube has the property of being non-conducting until the grid potential rises to a predetermined value dependent upon circuit conditions, whereupon the current in the plate circuit instantaneously rises to its maximum value, independent of its grid potential conditions. Current continues to flow in such tubes until the anode circuit is opened or the anode voltage is lowered to a small value, whereupon the current suddenly ceases until the tube is again activated by the grid control circuit. This property of the gaseous grid tube is used in this case for starting and stopping the charge on the condenser 20 used to measure time.

Impulses to the transmitter are furnished by means of an electrically driven tuning fork 21 having a period greater than the time for a wave to travel through the liquid column from the transmitter to the receiver as previously described. The tuning fork is driven by battery 22, solenoid 23, and contact 23a. A surge of current goes to transmitter T periodically when the tuning fork touches contact 23b.

Thyratron tube 19 has a grid circuit which is normally biased by a grid bias battery 24 so as to prevent the flow of current in the plate circuit comprised of a battery 25 and resistor 26. The impulse applied to transmitter T and also to the grid of tube 19 is sufficient, however, to drive the grid potential of tube 19 to a point where the tube begins to conduct current, and instantaneously a voltage appears across the terminals of resistor 26. This potential is used to charge condenser 20. The time rate of charge of condenser 20 is used as a measure of time and consequently a measure of velocity through the well strata. A high resistance 27 is inserted between the terminal of resistor 26 and condenser 20 so that the condenser charges slowly and the potential across the condenser increases with time from the moment of application of potential until the potential across the condenser equals that across resistor 26 or the flow of current through resistor 26 is interrupted. During the period following the interruption of current flow through resistor 26 and until the flow of current is again initiated in the input circuit, the condenser 20 discharges through resistors 26 and 27. Resistor 26 is of much lower resistance than resistor 27 so that its effect on the discharge rate of condenser 20 is negligible.

Bridged across the terminals of condenser 20 is the grid input circuit of triode tube 28, in the plate circuit of which is battery 29 and galvanometer 15. This triode tube is selected for its linear characteristic with respect to grid-voltage vs. plate-current and if the recording galvanometer is of the low resistance type a proper amount of resistance can be inserted in series with the galvanometer and plate battery to obtain a substantially linear response.

The grid of tube 28 is biased to a low value by means of battery 30.

In Figure 5, the arrangement of the circuit is such that the polarity of the charge that acculates on condenser 20 decreases the negative bias applied to the grid of vacuum tube 28, thus increasing the current flow in the plate circuit of that tube, so that the plate current is a measure of time. This will be further discussed in connection with the calibration of the device.

Returning now to the sound impulse that has been created in the borehole column by the transmitter T, this sound wave passes downward to receiver R and the first arrival of this wave is via the highest velocity path which is the walls adjacent to the borehole except for the top or unweathered layer, which is usually not of interest in a survey of this nature.

This first impulse received by receiver R is amplified by tube 31 and serves to trip or start the current flow in the gaseous triode 32. The plate circuit of this tube comprises battery 33, condenser 34 and resistor 35. Resistor 35 is of such a value that it will not support a continuous arc discharge in tube 32 but serves to accumulate a charge on condenser 34 during the inoperative periods of the gaseous tube 32.

The result of this arrangement is that the first impulse from the receiver causes an impulse of current consisting of the discharge of condenser 34 after which the tube becomes inoperative until such time as condenser 34 becomes recharged and the grid of the gaseous tube 32 receives a new impulse.

The return circuit from the cathode of tube 32 is through resistor 36 which is also included in the cathode return circuit of gaseous triode tube 19. The voltage of battery 33 is somewhat in excess of that of battery 25 which supplies current for tube 19 so that the counterelectromotive force created across resistor 36 by the comparatively large current surge from the tube 32 is sufficiently great to interrupt the current flow in tube 19 until such time as it is restored by another impulse occasioned by tuning fork 21.

From the above description and Figure 5 it can be seen readily that we have a device for periodically initiating a sound wave impulse in the liquid column of a borehole, at the same time starting the building up of a constant voltage charge on a condenser, also means for discontinuing the charging of and commencing the discharging of this condenser when the first sound impulse reaches a predetermined point removed from the source of the sound impulse. Therefore the potential charge accumulating on the condenser is a measure of the time of travel of the sound impulse through the material adjacent to the walls of the said borehole.

It is not essential that the borehole be filled with liquid, although this is the usual condition, since by suitably designing the transmitter and receiver the device can be operated in a dry hole.

As it is not desirable to record the individual variation of charges on the condenser 20 but only the average charge, it is preferable to use a galvanometer with a comparatively long period in excess of cyclic impulses from the fork actuating the device. However, a short period device can be used by inserting a properly designed low pass filter in the galvanometer circuit, as shown in Figure 8 which will be discussed hereinafter.

The maximum charge on the condenser which corresponds to a maximum flow of current through the metering tube 28 corresponds to very low velocity, and a zero charge on condenser 20 would be the result of an infinite velocity in the walls of the well. As the device is intended to be used over a finite range of velocities, the tube currents and galvanometer sensitivity are so selected that the maximum and minimum deflections on the recording film 16 (Figure 2) correspond to the maximum and minimum velocities to be encountered in the borehole. While calibration may be made on the instrument and curves prepared for converting the readings into times and velocities, it is desirable that the readings may be linear, either in times or velocities.

There is no difficulty in selecting a metering tube 28 with substantially linear characteristics, therefore the solution lies in the manner in which the voltage builds up on condenser 20 under the conditions of operation.

As previously described, this condenser is periodically charged at varying times and at a constant voltage applied through a series resistor. Sufficient time is allowed after each charge to permit the condenser to discharge fully before the next impulse is applied.

Under these conditions the curves of charge and discharge are as shown in Figure 6, where the potential $E_c$ across the terminals of the condenser 20 is plotted as a function of time. That portion of the curve from $o$ to $t_1$ represents the potentials during the charging period while that from $t_1$ to $t_s$ represent the potentials during the discharging period.

It is apparent that $t_s$ is a constant and is the period of the tuning fork initiating the impulses to the system.

The potential at the terminals of the condenser 20 during the charging period is a function of the applied voltage E, the series resistance R, the capacity of the condenser C, and the time $t_1$ during which the voltage E is applied and can be expressed by the formula:

$$E_c = E\left(1 - e^{-\frac{t_1}{RC}}\right)$$

The potential of the condenser during the period of discharge is:

$$E_c = E_T e^{-\frac{t_d}{RC}}$$

where $E_T$ represents the voltage at the terminals of the condenser at the time the discharge commences, and in this case $E_T$ is the same as $E_c$ in the first formula given above and $t_d$ is the time elapsed following the time at which discharge starts; or $t_d = t_s - t_1$ where $t_s$ = total elapsed time.

Metering tube 28, however, is arranged so that it does not record instantaneous voltages but indicates average voltages.

The average voltage in this case is the integral of the voltages over a complete cycle of charge and discharge divided by the time of the cycle and can be expressed by the formula $$E_{ave} = E \frac{\int_0^{t_1}\left(1-e^{-\frac{t}{RC}}\right)dt + \left(1-e^{-\frac{t_1}{RC}}\right)\int_{t_1}^{t_s} e^{-\frac{t_s-t_1}{RC}}dt}{t_s}$$

The solution of the above equation is:

$$E_{ave} = E \frac{t_1 + RC\left(e^{-\frac{t_s}{RC}} - e^{\frac{t_1-t_s}{RC}}\right)}{t_s}$$

A numerical solution of the above equation within the limits of times and circuit constants applicable to this case shows that the average potential at the terminals of the condenser is linear with respect to time as shown by curve in Figure 7, where the values were as follows:

RC = 0.01 ohm-farad
$t_c$ = 0.01 second
E = 1 volt

It can thus be seen that the apparatus can be made to indicate times directly.

The device can be calibrated directly by utilizing a tank of liquid of known sound velocity and varying the distance between the transmitter and receiver. Time lag in the instruments themselves can be compensated for by placing the receiver immediately adjacent to the transmitter and adjusting bias battery 30 so that the galvanometer reads zero time.

My device can be made to record velocities directly by replacing the galvanometer with some form of ratio instrument such as the magnetic vane instrument 37 of Figure 8, which is arranged so that the pointer 38 indicates the change of direction of the resultant field of the two coils 39 and 40 in the instrument.

The current in the upper coil 39 is adjusted by means of rheostat 41 and ammeter 42 proportional to the distance between the transmitter T and the receiver R in the borehole, while the current in the lower coil 40 is proportional to the time required for the wave to travel between the transmitter and receiver.

This recording device therefore records the ratio of these two values, or the velocity of sound travel through the walls adjacent to the borehole. It can, of course, be used with the apparatus of Figure 5 as well as with the modified apparatus B of Figure 8 shortly to be described.

The above methods contemplate the survey of an uncased borehole. Where casing is in the well the first wave to arrive at the receiver will be via the casing itself, as the velocity of sound in the casing is greater than that in either the liquid column or the strata adjacent to the casing. In such cases the second wave arriving at the receiver would be that traveling through the strata material.

For such cases the amplifier and Thyratron tubes associated with the receiving device can be arranged as shown in the lower portion of Figure 8. Here tube 32 operates in a similar manner to the tube bearing the same designation in Figure 5, but instead of interrupting the current in tube 19 it charges condenser 43 which sensitizes tube 44 so that when the second impulse reaches the receiver R this impulse discharges tube 44, which in turn discharges through resistor 36, thus interrupting the flow of current in tube 19, as previously described.

It can be seen readily that there is considerable latitude as to the selection of vacuum tubes, resistances, voltages, and condenser values to be used in this circuit, and the design data which follows is purely illustrative and is capable of considerable variation to meet conditions met with in practice. For example, the metering tube 28 can be selected for its filament, plate current, and grid bias characteristics, and the galvanometer 15 either built or purchased to fit the tube requirements or, vice versa, the galvanometer might be selected and a tube provided that will work with the galvanometer. This is a detail that will be apparent to anyone skilled in the art.

Let us assume that we have selected a tube 28 such as the RCA 6-C-5, which, when provided with a plate potential of 100 volts, will have a substantially linear grid-voltage vs. plate-current characteristics from 2 milliamperes to 9 milliamperes. Reference to the tube characteristic curves shows that a change of from 0 to 4 volts negative bias will be required at the grid in order to cause this variation of grid current.

Assuming that the maximum time to be measured is 0.002 second and the RC value is to be the same as described in obtaining the curve shown in Figure 7, which is on the basis of 1 volt across the series condenser and resistance combination. Reference to this curve shows that for an applied potential of one volt the potential on the condenser will reach 0.117 volt in 0.002 second.

As we require a potential of 4 volts for the grid at the time of 0.002 second, the required voltage drop on resistor 26 will be 4/0.117, or 34.2 volts. The current flow in tube 19 and the value of resistor 26 will be proportioned so as to obtain this amount of potential drop.

The value of RC used in the computation of the curve was 0.01. Theoretically it makes no difference what the individual values of these elements are provided only that their product equals the figure given.

Practically the condenser should be of value large enough that the input capacity of the tube and associated stray capacities will not appreciably alter the apparent capacity. We will therefore select a value of 0.1 microfarad and a resistance value of 100,000 ohms for this combination.

Resistance 36 should be of such value that the maximum discharge current from condenser 34 through tube 32 produces a potential drop at least equal to the potential of battery 25, since this insures the interruption of current flow in tube 19 when tube 32 discharges. The maximum current from tube 32, which in this case can be grid glow discharge tube #885, should not exceed 0.3 ampere and for good life of the tube we will limit it to 0.2 ampere.

The voltage of battery 25 must be at least equal to the potential drop across resistance 26, required for charging the timing condenser 20, plus 15 volts (drop in Thyratron tube 19) plus a small amount of drop in resistor 36. In this case we will fix the voltage of battery 25 at 60 volts.

Therefore, we will require a resistance value for 36 of 60/0.2=300 ohms.

The voltage of battery 33 would be 60+15=75 volts and resistance 35 would be of such value that the current available directly from battery 33 during the discharge period would be one milliampere or less. A value of 6,000 ohms would be suitable.

Tube 19 can also be a Thyratron #885 but a minimum amount of current for stable discharge can be used in this case, say 10 milliamperes. The voltage available in the circuit including resistors 26 and 36 and tube 19 would be 60−15=45 volts. Therefore the value of resistors 26 and 36 in series would be 45/0.010=4500 ohms, and as resistor 36 has been fixed at 300 ohms the value of resistor 26 would be 4200 ohms. The voltage drop across this resistor would be 42 volts and the exact amount of voltage for charging condenser 20 can be selected by adjusting the sliding contact of this resistance.

Other values in either the circuit of Figure 5 or that of Figure 8 are, in general, not critical and can be selected readily by anyone skilled in the art.

While I have described my invention in connection with certain specific embodiments thereof it is to be understood that these are by way of illustration and not by way of limitation and I do not mean to be limited thereto but only to the scope of the appended claims which should be construed as broadly as the prior art will permit. For instance, while I have shown circuits in which a timing condenser starts to charge simultaneously with the generation of the sound pulse and begins to discharge when the sound pulse is received, circuits of the reverse type can readily be provided by those skilled in the art to permit the condenser to charge when the pulse is received and to discharge when the next pulse is generated by the transmitter. In either case the average charge on the timing condenser provides a measure of the travel time of the pulse.

I claim:

1. Apparatus for determining the velocity of sound in the strata traversed by a cased well comprising means for generating a sound wave, means vertically spaced from said first-mentioned means for receiving said sound wave, electrical means for producing an electrical effect as a function of time, means associated with said generating means and actuated at the time of generation of said sound wave for initiating the production of said electrical effect, a first electrical circuit associated with said receiving means, a second electrical circuit associated with said receiving means, with said electrical means and with said first electrical circuit, said first electrical circuit operating upon receipt of the first sound wave arriving at said receiving means via the casing of said well to render said second electrical circuit responsive to the receipt of the second sound wave arriving at said receiving means via the strata traversed by said well, means associated with said receiving means and including said second electrical circuit for discontinuing the production of said electrical effect on receipt of said second sound wave at said receiving means and means responsive to said electrical means for recording the time required for said wave to travel between said generating means and said receiving means via the strata traversed by said well.

2. Apparatus for determining the velocity of sound in the strata traversed by a cased well comprising a sound transmitter for generating a sound pulse, a sound receiver spaced vertically from said sound transmitter for receiving said sound pulse, a condenser, means associated with said condenser for charging and discharging said condenser, means associated with said condenser and with said charging means operable simultaneously with the generation of said sound pulse for initiating the charging of said condenser, normally inoperative means associated with said receiver and with said discharging means responsive, when rendered operative, to the receipt of a sound pulse at said sound receiver for initiating the discharge of said condenser, means associated with said responsive means and with said receiver to render said responsive means operative upon the reception at said sound receiver of the first sound pulse arriving at said sound receiver via the casing of said well, whereby said responsive means is actuated by the receipt of the second sound pulse arriving at said sound receiver via the strata traversed by said well, and means associated with said condenser responsive to the average charge on said condenser to provide an indication of the travel time of said sound pulse passing from said sound transmitter to said sound receiver via the strata traversed by said well.

3. Apparatus for determining the velocity of sound in the strata traversed by a cased well comprising a sound transmitter for generating a sound pulse, a sound receiver spaced vertically from said sound transmitter for receiving said sound pulse, a condenser, means associated with said condenser for charging and discharging said condenser, means associated with said sound transmitter and with said condenser operable simultaneously with the generation of said sound pulse for initiating the charging of said condenser, a first vacuum tube circuit associated with said sound receiver responsive, when sensitized, to the receipt of a sound pulse at said sound receiver, a second vacuum tube circuit associated with said sound receiver responsive to the receipt of a sound pulse at said sound receiver, means associated with both said vacuum tube circuits actuated by said second vacuum tube circuit for sensitizing said first vacuum tube circuit upon the reception at said sound receiver of the sound pulse travelling from said sound transmitter to said sound receiver via the casing of said well, whereby said first vacuum tube circuit is rendered responsive to the receipt of the sound pulse travelling via the strata traversed by said borehole, means including said first vacuum tube circuit for initiating the discharge of said condenser, and means associated with said condenser and responsive to the average charge on said condenser to provide an indication of the travel time of said sound pulse passing from said sound transmitter to said sound receiver via the strata traversed by said well.

RAYMOND T. CLOUD.

CERTIFICATE OF CORRECTION.

Patent No. 2,238,991.                                              April 22, 1941.

RAYMOND T. CLOUD.

It is hereby certified that error appears in the printed specification of the above numbered patent requiring correction as follows: Page 2, first column, lines 21 and 22, strike out the words "by means of a hammer or clapper such as is used in electric door bells"; and second column, line 63-64, for "acculates" read --accumulates--; and that the said Letters Patent should be read with this correction therein that the same may conform to the record of the case in the Patent Office.

Signed and sealed this 20th day of May, A. D. 1941.

(Seal)

Henry Van Arsdale,
Acting Commissioner of Patents.